United States Patent Office 3,646,055
Patented Feb. 29, 1972

3,646,055
2,4-DIHYDRO-6-PHENYL-1H-s-TRIAZOLO[4,3-a][1,4] BENZODIAZEPIN-1-ONES
Jackson B. Hester, Jr., Portage, Mich., assignor to The Upjohn Company, Kalamazoo, Mich.
No Drawing. Filed Aug. 21, 1969, Ser. No. 852,112
Int. Cl. C07d 53/06, 57/02
U.S. Cl. 260—308 C                 3 Claims

ABSTRACT OF THE DISCLOSURE 2,4-dihydro-6-phenyl - 1H - s - triazolo[4,3-a]benzodiazepin-1-ones of the formula:

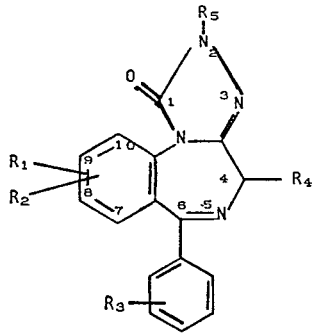

wherein $R_1$, $R_2$, and $R_3$ are selected from the group consisting of hydrogen, alkyl of 1 to 3 carbon atoms ,inclusive, halogen, nitro, cyano, trifluoromethyl, and alkoxy, alkylthio, alkylsulfinyl, alkylsulfonyl, alkanoylamino and dialkylamino, in which the carbon chain moieties are of 1 to 3 carbon atoms, inclusive, and wherein $R_5$ and $R_6$ are selected from the group consisting of hydrogen and alkyl, defined as above, are produced from selected 1,3-dihydro-5-phenyl-2H-1,4-benzodiazepine-2-thiones (I) by condensation with alkyl carbazate, yielding the corresponding 3-(5-phenyl-3H-1,4-benzodiazepin-2-yl)carbazic acid alkyl ester (II), and then heating II to an elevated temperature to obtain compound III (in which $R_5$ is hydrogen). Alkylation of the latter yields the products of Formula III in which $R_5$ is lower alkyl .The compounds of Formula III as well as the intermediates II and the pharmacologically acceptable acid addition salts thereof are useful to sedate and tranquilize domestic and zoo animals, particularly mammals and birds.

BACKGROUND OF THE INVENTION

Field of the invention

This invention is directed to new organic compounds and is particularly concerned with novel 2,4-dihydro-6-phenyl-1H-s-triazolo[4,3-a][1,4]benzodiazepin - 1 - ones, intermediates and a process for the production thereof.

The novel compounds and the process of production therefor can be illustratively represented as follows:

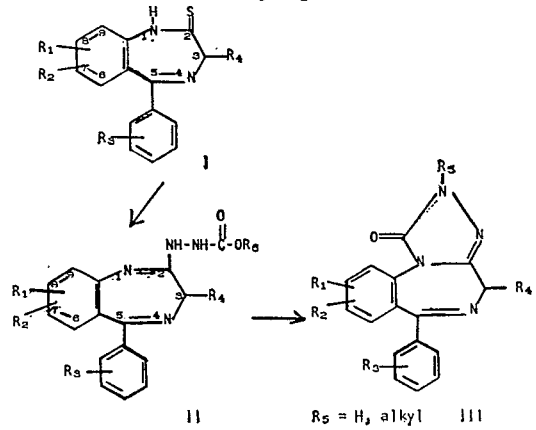

wherein $R_1$, $R_2$, and $R_3$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino, and dialkylamino, in which the carbon chain moieties are of 1 to 3 carbon atoms, inclusive; wherein $R_4$ and $R_5$ are selected from the group consisting of hydrogen and alkyl defined as above, and wherein $R_6$ is alkyl defined as above.

The invention also includes the acid addition salts, particularly the pharmacologically acceptable acid addition salts, of compounds II and III.

The process of the present invention comprises treating a 1,3 dihydro-5-phenyl-2H-1,4-benzodiazepine-2-thione (I) with alkyl carbazate to give the corresponding 3-(5-phenyl-3H-1,4-benzodiazepin-2-yl)carbazic acid alkyl ester (II), and heating II above the melting point to give the corresponding 2,4 - dihydro-6-phenyl-1H-s-triazolo [4,3-a][1,4]benzodiazepin-1-one (III, R=H). Compound III, R=H is also obtained if the first step of the reaction, the reaction of I with the alkyl carbazate, is carried out at a high temperature, e.g., at the reflux temperature of the mixture in a high-boiling solvent, such as 1-butanol.

DESCRIPTION OF THE PREFERRED EMBODIMENT

Lower-alkyl groups of 1 to 3 carbon atoms, inclusive, are exemplified by methyl, ethyl, propyl and isopropyl.

The carbon chain moiety of alkoxy, alkylthio, alkylsulfinyl, alkylsulfonyl, alkanoylamino, dialkylamino which is of 1 to 3 carbon atoms, inclusive, is defined as alkyl of 1 to 3 carbon atoms, inclusive, as above.

Examples of alkoxy are methoxy, ethoxy, propoxy and isopropoxy; examples of alkylthio are methylthio, ethylthio, propylthio, isopropylthio; examples of alkylsulfinyl are methylsulfinyl, ethylsulfinyl, propylsulfinyl, isopropylsulfinyl; examples of alkylsulfonyl are methylsulfonyl, ethylsulfonyl, propylsulfonyl and isopropylsulfonyl; examples of alkanoylamino are acetylamino and propionylamino; examples of dialkylamino are dimethylamino, diethylamino, dipropylamino and diisopropylamino.

The term halogen includes fluorine, chlorine, bromine and iodine.

The novel compounds of the Formulae II and III including acid addition salts thereof have sedative, tranquilizing, and muscle-relaxant and anti-aggressive behavior effects in mammals and birds.

The acid addition salts of compounds of Formulae II and III contemplated in this invention are the hydrochlorides, hydrobromides, hydroiodides, sulfates, phosphates, acetates, lactates, tartrates, citrates, salicylates, succinates, malates, maleates, pamoates, cyclohexanesulfamates, benzenesulfonates, toluenesulfonates, methanesulfonates and the like, prepared by reacting a compound of Formula II or Formula III with the stoichiometrically calculated amount of the selected pharmacologically acceptable acid.

The sedative effects of 3-(7-chloro-5-phenyl-3H-1,4-benzodiazepin-2-yl)carbazic acid ethyl ester (A) and 8-chloro-2,4-dihydro - 6 - phenyl-s-triazolo[4,3-a][1,4]benzodiazepin-1-one (B) are shown by the following tests in mice:

CHIMNEY TEST

[Med. Exp. 4, 11 (1961)]: The effective (intraperitoneal) dosage for 50% of mice, $ED_{50}$, for (A) 20 mg./kg.; for (B) 3.5 mg./kg. The test determines the ability of mice to back up and out of a vertical glass cylinder within 30 seconds. At the effective dosage, 50% of the mice failed doing it.

DISH TEST

Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. $ED_{50}$ (intraperitoneal administration) in this test for (A) was 32 mg./kg.; for (B) 1.0 mg./kg.; oral $ED_{50}$ for (B) 2.3 mg./kg.

PEDESTAL TEST

The untreated mouse leaves the pedestal in less than a minute to climb back to the floor of the standard mouse box. Tranquilized mice will stay more than 1 minute. $ED_{50}$ (intraperitoneal administration) for (A) 2 mg./kg.; for (B) 3.5 mg./kg.; $ED_{50}$ (oral administration) is 3.5 mg./kg. for (B).

NICOTINE ANTAGONISM TEST

Mice in a group of 6 are injected with the test compounds (A) and (B). Thirty minutes later the mice, including control (untreated) mice, are injected with 2 mg./kg. nicotine salicylate. The control mice show overstimulation, i.e., (1) running convulsions followed by (2) tonic extensor fits; followed by (3) death. An intraperitoneal dosage of 4 mg./kg. of (A) or 1.4 mg./kg. of (B) protected 50% of the mice against (2) and 5 mg./kg. of (A) or 1.6 mg./kg. of (B) against (3) ($ED_{50}$); oral $ED_{50}$ is 2 mg./kg. of (B) against both (2) and (3).

8-chloro-2,4-dihydro - 2 - methyl - 6 - phenyl-1H-s-triazolo[4,3-a][1,4]benzodiazepin-1-one hydrochloride has an effective $ED_{50}$ in the—

| | Mg./kg. |
|---|---|
| Chimney test at | 2.5 |
| Dish test | 1.8 |
| Pedestal test | 2.2 |
| Nicotine Antagonism test (2) | 1.0 |
| Nicotine Antagonism test (3) | 1.0 |

The pharmaceutical forms contemplated by this invention include pharmaceutical compositions suited for oral, parenteral and rectal use, e.g., tablets, pills, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds, food premixes with starch, oatmeal, dried fishmeat, fishmeal, flour and the like can be prepared.

As tranquilizer the compounds of Formulae II and III can be used in dosages of 0.5–10 mg./kg. in oral or injectable preparations as described above, to alleviate tension and anxiety in mammals, or birds, such as e.g., occurs when animals (dogs, cats, horses, cattle, zoo animals) are in travel.

Other acid addition salts of the compounds of Formulae II and III can be made such as the fluosilicic acid addition salts which are useful mothproofing compounds or the trichloroacetates useful as herbicides against Johnson grass, Bermula grass, yellow foxtail, green foxtail and quack grass.

The starting materials of Formula I of this invention, substituted or unsubstituted 1,3-dihydro-5-phenyl-2H-1,4-benzodiazepine-2-thiones, are described by G. A. Archer and L. H. Sternbach in J. Org. Chem. 20, 231 (1964) and in U.S. Pat. 3,422,091. These compounds (I) are made by heating the known substituted or unsubstituted 1,3-dihydro - 5 - phenyl-2H-1,4-benzodiazepin-2-ones with phosphorus pentasulfide in pyridine for about 45 minutes Archer et al., supra). The following compounds of Formula I are representative starting products:

1,3-dihydro-5-phenyl-2H-1,4-benzodiazepine-2-thione;
6-chloro-1,3-dihydro-5-(m-bromophenyl)-2H-1,4-benzodiazepine-2-thione;
7-chloro-1,3-dihydro-5-phenyl-2H-1,4-benzodiazepine-2-thione;
8-chloro-1,3-dihydro-5-phenyl-2H-1,4-benzodiazepine-2-thione;
7-bromo-1,3-dihydro-5-phenyl-2H-1,4-benzodiazepine-2-thione;
9-bromo-1,3-dihydro-5-phenyl-2H-1,4-benzodiazepine-2-thione;
7-methyl-1,3-dihydro-5-phenyl-2H-1,4-benzodiazepine-2-thione;
7-nitro-1,3-dihydro-5-phenyl-2H-1,4-benzodiazepine-2-thione;
7-fluoro-1,3-dihydro-5-phenyl-2H-1,4-benzodiazepine-2-thione;
7-trifluoromethyl-1,3-dihydro-5-phenyl-2H-1,4-benzodiazepine-2-thione;
9-trifluoromethyl-1,3-dihydro-5-[p-(propionylamino)phenyl]-2H-1,4-benzodiazepine-2-thione;
7-cyano-1,3-dihydro-5-phenyl-2H-1,4-benzodiazepine-2-thione;
8-cyano-1,3-dihydro-5-[p-(trifluoromethyl)phenyl]-2H-1,4-benzodiazepine-2-thione;
7-chloro-1,3-dihydro-5-(o-chlorophenyl)-2H-1,4-benzodiazepine-2-thione;
6-ethylthio-1,3-dihydro-5-(o-bromophenyl)-2H-1,4-benzodiazepine-2-thione;
6,8-dichloro-1,3-dihydro-5-(o-fluorophenyl)-2H-1,4-benzodiazepine-2-thione;
8-propoxy-7-bromo-1,3-dihydro-5-[m-(ethylsulfinyl)phenyl]-2H-1,4-benzodiazepine-2-thione;
9-diisopropylamino-7-methyl-1,3-dihydro-5-[m-(propylsulfonyl)phenyl]-2H-1,4-benzodiazepine-2-thione;
7-bromo-1,3-dihydro-5-(o-fluorophenyl)-2H-1,4-benzodiazepine-2-thione;
3-methyl-1,3-dihydro-5-(o-fluorophenyl)-2H-1,4-benzodiazepine-2-thione;
7-fluoro-1,3-dihydro-5-(o-fluorophenyl)-2H-1,4-benzodiazepine-2-thione;
3-methyl-1,3-dihydro-5-(p-fluorophenyl)-2H-1,4-benzodiazepine-2-thione;
7-nitro-1,3-dihydro-5-(o-chlorophenyl)-2H-1,4-benzodiazepine-2-thione;
8-nitro-1,3-dihydro-5-(o-chlorophenyl)-2H-1,4-benzodiazepine-2-thione;
7-bromo-1,3-dihydro-5-(o-bromophenyl)-2H-1,4-benzodiazepine-2-thione;
7-methylsulfinyl-1,3-dihydro-5-(o-fluorophenyl)-2H-1,4-benzodiazepine-2-thione;
7-methyl-1,3-dihydro-5-(o-chlorophenyl)-2H-1,4-benzodiazepine-2-thione;
7-methylthio-1,3-dihydro-5-phenyl-2H-1,4-benzodiazepine-2-thione;
7-cyano-1,3-dihydro-5-(o-chlorophenyl)-2H-1,4-benzodiazepine-2-thione;
3,6,8-trimethyl-1,3-dihydro-5-(o-chlorophenyl)-2H-1,4-benzodiazepine-2-thione;
9-propylsulfonyl-7-methyl-1,3-dihydro-5-phenyl-2H-1,4-benzodiazepine-2-thione;
7-trifluoromethyl-1,3-dihydro-5-(o-chlorophenyl)-2H-1,4-benzodiazeptine-2-thione;
7-dimethylamino-1,3-dihydro-5-phenyl-2H-1,4-benzodiazepine-2-thione;
7-fluoro-1,3-dihydro-5-(o-chlorophenyl)-2H-1,4-benzodiazepine-2-thione;
7,8-dicyano-1,3-dihydro-5-[p-(methylsulfonyl)phenyl]-2H-1,4-benzodiazepine-2-thione;
6,9-dichloro-1,3-dihydro-5-(p-isopropylphenyl)-2H-1,4-benzodiazepine-2-thione;
6,8-diethyl-1,3-dihydro-5-(m-ethylphenyl)-2H-1,4-benzodiazepine-2-thione;
6-nitro-1,3-dihydro-5-(o-cyanophenyl)-2H-1,4-benzodiazepine-2-thione;

7,9-bis(dipropylamino)-1,3-dihydro-5-(o-nitrophenyl)-2H-1,4-benzodiazepine-2-thione;
9-acetylamino-1,3-dihydro-5-(p-cyanophenyl)-2H-1,4-benzodiazepine-2-thione; and the like.

In carrying out the process of the invention, a selected 1,3 - dihydro - 5 - phenyl - 2H - 1,4 - benzodiazepine - 2 - thione (I) in an inert organic solvent, preferably in a lower alkenol, e.g., methanol, ethanol, 1-propanol, 2-propanol, 1-butanol, 2-butanol, dioxane, tetrahydrofuran, dimethyl sulfoxide or the like is heated to between 60–150° C., preferably to the reflux temperature of the mixture, with alkyl carbazate (preferably in excess). In the preferred embodiment of this invention the reaction is carried out with nitrogen bubbling through the reaction mixture and at reflux temperature during a period of 4 to 48 hours. After the reaction is terminated the product is obtained by concentrating the mixture and is purified by crystallization. At the lower temperatures the 3-(5 - phenyl - 3H - 1,4 - benzodiazepin - 2 - yl)carbazic acid alkyl ester (II) is thus obtained. At elevated temperatures the product 2,4 - dihydro -6 - phenyl - 1H - s-triazolo[4,3-a][1,4]benzodiazepin - 1 - one (III in which $R_5$ is hydrogen) is obtained. The same product is obtained from the ester (II) by heating the ester to about 190–260° C. in a nitrogen atmosphere.

Product III wherein $R_5$ is alkyl is obtained by alkylation of III ($R_5$ is hydrogen) in conventional manner, e.g., with alkyl halide, dialkyl sulfate, diazomethane or diazoethane and the like.

The following examples are illustrative of the processes and products of the present invention, but are not to be construed as limiting.

EXAMPLE 1

*3-(7-chloro-5-phenyl-3H-1,4-benzodiazepin-2-yl) carbazic acid ethyl ester*

A mixture of 7-chloro-1,3-dihydro-5-phenyl-2H-1,4-benzodiazepine-2-thione (1.43 g.; 0.005 mole), ethyl carbazate (1.29 g.; 0.015 mole) and absolute ethanol (50 ml.) was refluxed for 14 hours with a slow stream of nitrogen bubbling through the mixture. The mixture was then concentrated to give a residue and the residue was crystallized from methylene chloride-ethyl acetate to give 1.38 g. (77% yield) of 3-(7-chloro-5-phenyl-3H-benzodiazepin-2-yl)carbazic acid ethyl ester of melting point 195.5–197.5° C. (dec.). The analytical sample, prepared by recrystallization from the above solvent mixture, had a melting point of 198–199° C. (dec.).

Ultraviolet (ethanol): $\lambda_{max}$ 213 ($\epsilon$=30,600), 229 ($\epsilon$=27,750), 258 ($\epsilon$=28,050), 339 m$\mu$ ($\epsilon$=2,050).

*Analysis.*—Calcd. for $C_{18}H_{17}ClN_4O_2$ (percent): C, 60.59; H, 4.80; Cl, 9.94; N, 15.70. Found (percent): C, 60.57; H, 4.73; Cl, 9.98; N, 15.40.

EXAMPLE 2

*3-(6-chloro-5-phenyl-3H-1,4-benzodiazepin-2-yl) carbazic acid ethyl ester*

In the manner given in Example 1, 6-chloro-1,3-dihydro-5-phenyl-2H-1,4-benzodiazepine-2-thione was refluxed with ethyl carbazate in ethanol to give 3-(6-chloro-5-phenyl-3H-1,4-benzodiazepin-2-yl)carbazic acid ethyl ester.

EXAMPLE 3

*3-(7-bromo-5-phenyl-3H-1,4-benzodiazepin-2-yl)- carbazic acid ethyl ester*

In the manner given in Example 1, 7-bromo-1,3-dihydro-5-phenyl-2H-1,4-benzodiazepine-2-thione was refluxed with ethyl carbazate in ethanol to give 3-(7-bromo-5-phenyl-3H-1,4-benzodiazepin-2-yl)carbazic acid ethyl ester.

EXAMPLE 4

*3-(9-trifluoromethyl-5-[(p - propionylamino)phenyl]-3H-1,4-benzodiazepin-2-yl)carbazic acid ethyl ester*

In the manner given in Example 1, 9-trifluoromethyl-1,3-dihydro - 5 - [(p-propionylamino(phenyl]-2H-1,4-benzodiazepine-2-thione was refluxed with ethyl carbazate in ethanol to give 3-(9-trifluoromethyl-5-[(p-propionylamino)phenyl] - 3H - 1,4 - benzodiazepin-2-yl)carbazic acid ethyl ester.

EXAMPLE 5

*3-(8-cyano-5-(p-trifluoromethylphenyl)-3H-1,4-benzodiazepin-2-yl)carbazic acid methyl ester*

In the manner given in Example 1, 8-cyano-1,3-dihydro-5-(p - trifluoromethylphenyl)-2H-1,4-benzodiazepine-2-thione was refluxed with methyl carbazate in methanol to give 3-(8-cyano-5-(p-trifluoromethylphenyl)-3H-1,4-benzodiazepin-2-yl)carbazic acid methyl ester.

EXAMPLE 6

*3-(8-propoxy-7-bromo-5-(m-ethylsulfinylphenyl)-3H-1,4-benzodiazepin-2-yl)carbazic acid isopropyl ester*

In the manner given in Example 1, 8-propoxy-7-bromo-1,3-dihydro - 5 - (m-ethylsulfinylphenyl)-2H-1,4-benzodiazepine-2-thione was refluxed with isopropyl carbazate in 2-propanol to give 3-(8-propoxy-7-bromo-5-(m-ethylsulfinylphenyl) - 3H-1,4-benzodiazepin-2-yl)carbazic acid isopropyl ester.

EXAMPLE 7

*3-(7-nitro-5-(o-chlorophenyl)-3H-1,4-benzodiazepin-2-yl)carbazic acid propyl ester*

In the manner given in Example 1, 7-nitro-1,3-dihydro-5 - (o-chlorophenyl)-2H-1,4-benzodiazepine-2-thione was refluxed with propyl carbazate in 1-propanol to give 3-(7-nitro - 5 - (o-chlorophenyl)-3H-1,4-benzodiazepin-2-yl)-carbazic acid propyl ester.

EXAMPLE 8

*3-(3,6,8-trimethyl-5-(o-chlorophenyl)-3H-1,4-benzodiazepin-2-yl)carbazic acid ethyl ester*

In the manner given in Example 1, 3,6,8-trimethyl-1,3-dihydro - 5 - (o-chlorophenyl)-2H-1,4-benzodiazepine-2-thione was refluxed with ethyl carbazate in ethanol to give 3 - (3,6,8-trimethyl - 5 - (o-chlorophenyl)-3H-1,4-benzodiazepin-2-yl)carbazic acid ethyl ester.

EXAMPLE 9

*3-(7,8-dicyano-5-(p-methylsulfonylphenyl)-3H-1,4-benzodiazepin-2-yl)carbazic acid ethyl ester*

In the manner given in Example 1, 7,8-dicyano-1,3-dihydro-5-(p-methylsulfonylphenyl) - 2H - 1,4 - benzodiazepine-2-thione was refluxed with ethyl carbazate in ethanol to give 3-(7,8-dicyano-5-(p-methylsulfonylphenyl)-3H-1,4-benzodiazepin-2-yl)carbazic acid ethyl ester.

EXAMPLE 10

*3-(9-acetylamino-5-(p-cyanophenyl)-3H-1,4-benzodiazepin-2-yl)carbazic acid ethyl ester*

In the manner given in Example 1, 9-acetylamino-1,3-dihydro - 5 - (p-cyanophenyl)-2H-1,4-benzodiazepine-2-thione was refluxed with ethyl carbazate in ethanol to give 3 - (9-acetylamino-5-(p-cyanophenyl)-3H-1,4-benzodiazepin-2-yl)carbazic acid ethyl ester.

EXAMPLE 11

*8-chloro-2,4-dihydro-6-phenyl-1H-s-triazolo[4,3-a]-[1,4]benzodiazepin-1-one*

3-(7-chloro - 5 - phenyl-3H-1,4-benzodiazepin-2-yl)carbazic acid ethyl ester (0.50 g.; 0.0014 mole) was heated under nitrogen at 197–207° C. for 15 minutes. The cooled melt was crystallized from ethanol to give 0.28 g. of 8-chloro - 2,4 - dihydro-6-phenyl-1H-s-triazolo[4,3-a][1,4]

benzodiazepin-1-one, which on recrystallization from ethanol had a melting point of 255–256° C.

Ultraviolet (ethanol): $\lambda_{max}$ 214 ($\epsilon$=34,800), 250 ($\epsilon$=15,600), inflection 304 m$\mu$ ($\epsilon$=1,560).

*Analysis.*—Calcd. for $C_{16}H_{11}ClN_4O$: (percent): C, 61.84; H, 3.57; Cl, 11.41; N, 18.03. Found (percent): C, 61.44; H, 3.57; Cl, 11.46; N, 17.90.

EXAMPLE 12

*7-chloro-2,4-dihydro-6-phenyl-1H-s-triazolo [4,3-a][1,4]benzodiazepin-1-one*

In the manner given in Example 11, 3-(6-chloro-5-phenyl-3H-1,4-benzodiazepin - 2 - yl)carbazic acid ethyl ester was heated to 200–210° C. and then recrystallized from ethanol to give 7-chloro-2,4-dihydro-6-phenyl-1H-s-triazolo[4,3-a][1,4]benzodiazepin-1-one.

EXAMPLE 13

*8-bromo-2,4-dihydro-6-phenyl-1H-s-triazolo [4,3-a][1,4]benzodiazepin-1-one*

In the manner given in Example 11, 3-(7-bromo-5-phenyl - 3H-1,4 - benzodiazepin-2-yl)carbazic acid ethyl ester was heated to 200–210° C. and then recrystallized from ethanol to give 8-bromo-2,4-dihydro-6-phenyl-1H-s-triazolo[4,3-a][1,4]benzodiazepin-1-one.

EXAMPLE 14

*10-trifluoromethyl - 2,4 - dihydro - 6 - (p-propionylaminophenyl)-1H-s-triazolo[4,3-a][1,4]benzodiazepin-1-one*

In the manner given in Example 11, 3-(9-trifluoromethyl - 5 - (p-propionylaminophenyl)-3H-1,4-benzodiazepin-2-yl)carbazic acid ethyl ester was heated to 200–210° C. and recrystallized from ethanol to give 10-trifluoromethyl - 2,4 - dihydro-6-(p-propionylaminophenyl)-1H-s-triazolo[4,3-a][1,4]benzodiazepin-1-one.

EXAMPLE 15

*9-cyano-2,4-dihydro-6-(p-trifluoromethylphenyl)-1H-s-triazolo[4,3-a][1,4]benzodiazepin-1-one*

In the manner given in Example 11, 3-(8-cyano-5-(p-trifluoromethylphenyl) - 3H - 1,4 - benzodiazepin-2-yl)-carbazic acid methyl ester was heated to 200–210° C. and then recrystallized from ethanol to give 9-cyano-2,4-dihydro-6 - (p-trifluoromethylphenyl)-1H-s-triazolo[4,3-a][1,4]benzodiazepin-1-one.

EXAMPLE 16

*9-propoxy-8-bromo - 2,4 - dihydro - 6 - (m-ethylsulfinylphenyl) - 1H - s - triazolo[4,3-a][1,4]benzodiazepin-1-one*

In the manner given in Example 11, 3-(8-propoxy-7-bromo-5-(m-ethylsulfinylphenyl)-3H-1,4 - benzodiazepin-2-yl)carbazic acid isopropyl ester was heated to 200–210° C., and then recrystallized from ethanol to give 9-propoxy-8-bromo-2,4-dihydro - 6 - (m-ethylsulfinylphenyl)-1H-s-triazolo[4,3-a][1,4]benzodiazepin-1-one.

EXAMPLE 17

*8-nitro-2,4-dihydro-6-(o-chlorophenyl)-1H-s-triazolo [4,3-a][1,4]benzodiazepin-1-one*

In the manner given in Example 11, 3-(7-nitro-5-(o-chlorophenyl)-3H-1,4-benzodiazepin - 2-yl)carbazic acid propyl ester was heated to 200–210° C. and then recrystallized from ethanol to give 8-nitro-2,4-dihydro-6-(o-chlorophenyl) - 1H-s-triazolo-[4,3-a][1,4]benzodiazepin-1-one.

EXAMPLE 18

*4,7,9-trimethyl-2,4-dihydro-6-(o-chlorophenyl)-1H-s-triazolo[4,3-a][1,4]benzodiazepin-1-one*

In the manner given in Example 11, 3-(3,6,8-trimethyl-5-(o-chlorophenyl)-3H-1,4-benzodiazepin - 2 - yl)carbazic acid ethyl ester was heated to 200–210° C. and then re- crystallized from ethanol to give 4,7,9-trimethyl-2,4-dihydro - 6 - (o-chlorophenyl)-1H-s-triazolo[4,3-a][1,4] benzodiazepin-1-one.

EXAMPLE 19

*8,9-dicyano-2,4-dihydro-6-(p-methylsulfonylphenyl)-1H-s-triazolo[4,3-a][1,4]benzodiazepin-1-one*

In the manner given in Example 11, 3-(7,8-dicyano-5-(p-methylsulfonylphenyl)-3H - 1,4 - benzodiazepin-2-yl) carbazic acid ethyl ester was heated to 200–210° C. and then recrystallized from ethanol to give 8,9-dicyano-2,4-dihydro-6-(p-methylsulfonylphenyl) - 1H - s - triazolo [4,3-a][1,4]benzodiazepin-1-one.

EXAMPLE 20

*10-acetylamino-2,4-dihydro-6-(p-cyanophenyl)-1H-s-triazolo[4,3-a][1,4]benzodiazepin-1-one*

In the manner given in Example 11, 3-(9-acetylamino-5 - (p-cyanophenyl)-3H-1,4-benzodiazepin-2-yl)carbazic acid methyl ester was heated to 200–210° C. and then recrystallized from ethanol to give 10-acetylamino-2,4-dihydro - 6 - (p-cyanophenyl) - 1H-s-triazolo[4,3-a][1,4] benzodiazepin-1-one.

EXAMPLE 21

*7,9-diethyl-2,4-dihydro-6-(m-ethylphenyl)-1H-s-triazolo [4,3-a][1,4]benzodiazepin-1-one*

A mixture of 6,8 - diethyl-1,3-dihydro-5-(m-ethylphenyl)-2H-1,4-benzodiazepine-2-thione (1.2 g.) was refluxed with ethyl carbazate (0.92 g.) in 50 ml. of 1-butanol for 30 hours in a nitrogen atmosphere. The mixture was evaporated and the residue was recrystallized three times from ethanol to give 7,9-diethyl-2,4-dihydro-6-(m-ethylphenyl)-1H-s-triazolo[4,3-a][1,4]benzodiazepin-1-one.

EXAMPLE 22

*2,4-dihydro-6-phenyl-1H-s-triazolo[4,3-a][1,4]-benzodiazepin-1-one*

In the manner given in Example 21, 1,3-dihydro-5-phenyl-2H-1,4-benzodiazepine-2-thione was refluxed with ethyl carbazate in 1-butanol to give 2,4-dihydro-6-phenyl-1H-s-triazolo[4,3-a][1,4]benzodiazepin-1-one.

EXAMPLE 23

*8-chloro-2,4-dihydro - 2 - methyl-6-phenyl-1H-s-triazolo [4,3-a][1,4]benzodiazepine-1-one and its hydrochloride*

A solution of 1.0 g. of 8-chloro-2,4-dihydro-6-phenyl-1H-s-triazolo[4,3-a][1,4]benzodiazepin-1-one in 25 ml. of dry dimethylformamide in a nitrogen atmosphere was treated with 0.145 g. of sodium hydride (a 58% suspension of NaH in mineral oil). This mixture was heated on the steam bath for 15 minutes resulting in a solution. The solution was cooled in an ice-bath and thereto was added 0.5 g. of methyl iodide in about 5 ml. of ether. After stirring the reaction mixture for 18 hours at about 22–24° C., the mixture was concentrated and the resulting residue chromatographed over 100 g. of silica gel with an ethyl acetate-cyclohexane (in 1:1 by volume ratio) solution. Fractions 9–15 (20 ml. each) contained the desired product. Evaporation of these fractions gave oily 8-chloro-2,4-dihydro - 2 - methyl-6-phenyl-1H-s-triazolo [4,3-a][1,4]benzodiazepin-1-one. The latter was converted with ethereal hydrogen chloride to its hydrochloride salt to give 0.4 g. of 8-chloro-2,4-dihydro-2-methyl-6-phenyl-1H-s-triazolo[4,3-a][1,4]benzodiazepin - 1 - one hydrochloride which after recrystallization from methanol-ethyl acetate had a melting point of 224–235° C.

*Analysis.*—Calcd. for $C_{17}H_{13}ClN_4O \cdot HCl$ (percent): C, 56.52; H, 3.91; Cl, 19.63; N, 15.51. Found (percent): C, 56.27; H, 4.00; Cl. 19.49; N, 15.44.

8 - chloro-2,4-dihydro - 2 - methyl-6-phenyl-1H-s-triazolo[4,3-a][1,4]benzodiazepin-1-one was also obtained by reacting 8 - chloro-2,4-dihydro-6-phenyl-1H-s-triazolo

[4,3-a][1,4]benzodiazepin-1 - one in methylene chloride and methanol with diazomethane at about 0–5° C.

EXAMPLE 24

*8-chloro-2,4-dihydro-2-ethyl-6-phenyl-1H-s-triazolo [4,3-a][1,4]benzodiazepin-1-one*

In the manner given in Example 23, 8-chloro-2,4-dihydro-6-phenyl - 1H-s-triazolo[4,3-a][1,4]benzodiazepin-1-one was reacted with sodium hydride and then with ethyl bromide to give 8 - chloro-2,4-dihydro-2-ethyl-6-phenyl-1H-s-triazolo[4,3-a][1,4]benzodiazepin-1-one.

EXAMPLE 25

*8-bromo-2,4-dihydro-2-propyl-6-phenyl-1H-s-triazolo [4,3-a][1,4]benzodiazepin-1-one*

In the manner given in Example 23, 8-bromo-2,4-dihydro-6-phenyl - 1H-s-triazolo[4,3-a][1,4]benzodiazepin-1-one was reacted with sodium hydride and then with propyl iodide to give 8 - bromo-1,4-dihydro-2-propyl-6-phenyl1H-s-triazolo[4,3-a][1,4]benzodiazepin-1-one.

EXAMPLE 26

*10-trifluoromethyl-2,4-dihydro - 2 - isopropyl-6-(p-propionylaminophenyl) - 1H - s-triazolo[4,3-a][1,4]benzodiazepin-1-one*

In a manner given in Example 23, 10-trifluoromethyl-2,4-dihydro - 6 - (p-propionylaminophenyl)-1H-s-triazolo-[4,3-a][1,4]benzodiazepin-1-one was reacted with sodium hydride and then with isopropyl iodide to give 10-trifluoromethyl-2,4-dihydro - 2 - isopropyl-6-(p-propionylaminophenyl)-1H-s-triazolo[4,3-a][1,4]benzodiazepin-1-one.

EXAMPLE 27

*2,4,7,9-tetramethyl-2,4-dihydro-6-(o-chlorophenyl)-1H-s-triazolo[4,3-a][1,4]benzodazepin-1-one*

In the manner given in Example 23, 4,7,9-trimethyl-2,4 - dihydro - 6 - (o - chlorophenyl)-1H-s-triazolo[4,3-a] [1,4]benzodiazepin-1-one was reacted with sodium hydride and then with methyl iodide to give 2,4,7,9-tetramethyl - 2,4 - dihydro - 6-(o-chlorophenyl)-1H-s-triazolo-[4,3-a][1,4]benzodiazepin-1-one.

EXAMPLE 28

*8,9-dicyano-2,4-dihydro-2-ethyl-6-(p-methylsulfonylphenyl)-1H-s-triazolo[4,3-a][1,4]benzodiazepin-1-one*

In the manner given in Example 23, 8,9-dicyano-2,4-dihydro - 6 - (p-methylsulfonylphenyl)-1H-s-triazolo[4,3-a][1,4]benzodiazepin-1-one was reacted with sodium hydride and then with ethyl iodide to give 8,9-dicyano-2,4-dihydro - 2 - ethyl - 6 - (p-methylsulfonylphenyl)-1H-s-triazolo[4,3-a][1,4]benzodiazepin-1-one.

In the manner given in Example 1, other 3-(5-phenyl-3H-1,4-benzodiazepin-2-yl)carbazic acid alkyl esters of Formula II are prepared by reacting a 1,3-dihydro-5-phenyl-2H-1,4-benzodiazepine-2-thione of Formula I with alkyl carbazate in a lower alkanol at the reflux temperature. Representative compounds thus obtained include:

3-(6-chloro-5-(m-bromophenyl)-3H-1,4-benzodiazepin-2-yl)carbazic acid ethyl ester;
3-(7-methyl-5-phenyl-3H-1,4-benzodiazepin-2-yl)carbazic acid ethyl ester;
3-(7-nitro-5-phenyl-3H-1,4-benzodiazepin-2-yl)carbazic acid ethyl ester;
3-(7-fluoro-5-phenyl-3H-1,4-benzodiazepin-2-yl)carbazic acid ethyl ester;
3-(7-trifluoromethyl-5-phenyl-3H-1,4-benzodiazepin-2-yl)carbazic acid ethyl ester;
3-(7-cyano-5-phenyl-3H-1,4-benzodiazepin-2-yl)carbazic acid ethyl ester;
3-(7-chloro-5-(o-chlorophenyl)-3H-1,4-benzodiazepin-2-yl)carbazic acid ethyl ester;
3-(6-ethylthio-5-(o-bromophenyl)-3H-1,4-benzodiazepin-2-yl)carbazic acid methyl ester;
3-(6,8-dichloro-5-(o-fluorophenyl)-3H-1,4-benzodiazepin-2-yl)carbazic acid ethyl ester;
3-(8-nitro-5-(o-chlorophenyl)-3H-1,4-benzodiazepin-2-yl)carbazic acid methyl ester;
3-(7-bromo-5-(o-bromophenyl)-3H-1,4-benzodiazepin-2-yl)carbazic acid ethyl ester;
3-(7-methylsulfinyl-5-(o-fluorophenyl)-3H-1,4-benzodiazepin-2-yl)carbazic acid propyl ester;
3-(9-propylsulfonyl-7-methyl-5-phenyl-3H-1,4-benzodiazepin-2-yl)carbazic acid isopropyl ester;
3-(7-dimethylamino-5-phenyl-3H-1,4-benzodiazepin-2-yl)carbazic acid ethyl ester;
3-(7,8-dicyano-5-(p-methylsulfonylphenyl)-3H-1,4-benzodiazepin-2-yl)carbazic acid ethyl ester; and the like.

In the same manner given in Example 11, other 2,4-dihydro - 6 - phenyl-1H-s-triazolo[4,3-a][1,4]benzodiazepin-1-ones are prepared by heating a selected 3-(5-phenyl-3H-1,4-benzodiazepin-2-yl)carbazic acid alkyl ester to between 190–260° C. Representative compounds thus obtained include:

7-chloro-2,4-dihydro-6-(m-bromophenyl)-1H-s-triazolo-[4,3-a][1,4]benzodiazepin-1-one;
8-methyl-2,4-dihydro-6-phenyl-1H-s-triazolo[4,3-a][1,4] benzodiazepin-1-one;
8-nitro-2,4-dihydro-6-phenyl-1H-s-triazolo[4,3-a][1,4] benzodiazepin-1-one;
8-fluoro-2,4-dihydro-6-phenyl-1H-s-triazolo[4,3-a][1,4] benzodiazepin-1-one;
8-trifluoromethyl-2,4-dihydro-6-phenyl-1H-s-triazolo-[4,3-a][1,4]benzodiazepin-1-one;
8-cyano-2,4-dihydro-6-phenyl-1H-s-triazolo[4,3-a][1,4] benzodiazepine-1-one;
8-chloro-2,4-dihydro-6-(o-chlorophenyl)-1H-s-triazolo-[4,3-a][1,4]benzodiazepin-1-one;
7-ethylthio-2,4-dihydro-6-(o-bromophenyl)-1H-s-triazolo-[4,3-a][1,4]benzodiazepin-1-one;
6,8-dichloro-2,4-dihydro-6-(o-fluorophenyl)-1H-s-triazolo[4,3-a][1,4]benzodiazepin-1-one;
9-nitro-2,4-dihydro-6-(o-chlorophenyl)-1H-s-triazolo-[4,3-a][1,4]benzodiazepin-1-one;
8-bromo-2,4-dihydro-6-(o-bromophenyl)-1H-s-triazolo-[4,3-a][1,4]benzodiazepin-1-one;
8-methylsulfinyl-2,4-dihydro-6-(o-fluorophenyl)-1H-s-triazolo[4,3-a][1,4]benzodiazepin-1-one;
10-propylsulfonyl-2,4-dihydro-8-methyl-6-phenyl-1H-s-triazolo[4,3-a][1,4]benzodiazepin-1-one;
8-dimethylamino-2,4-dihydro-6-phenyl-1H-s-triazolo-[4,3-a][1,4]benzodiazepin-1-one;
8,9-dicyano-2,4-dihydro-6-(p-methylsulfonylphenyl)-1H-s-triazolo[4,3-a][1,4]benzodiazepin-1-one; and the like.

The compounds of the foregoing examples and lists are converted to acid addition salts by reaction with stoichiometrically calculated amounts of selected acids in water, ethanol, or with the hydrogen halides in particular, in ether. In this manner the hydrochlorides, hydrobromides, hydroiodides, sulfates, phosphates, acetates, propionates, lactates, tartrates, citrates, maleates, malates, pamoates, benzenesulfonates, p-toluenesulfonates, methanesulfonates, cyclohexanesulfamates, salicylates and the like of the foregoing 2,4-dihydro-6-phenyl-1H-s-triazolo-[4,3-a][1,4]benzodiazepin-1-ones and 3-(5-phenyl-3H-1,4-benzodiazepin-2-yl)carbazic acid alkyl esters are obtained.

What is claimed is:
1. A compound selected from the group consisting of 2,4-dihydro-6-phenyl - 1H - s-triazolo[4,3-a]benzodiazepin-1-one of the formula III:

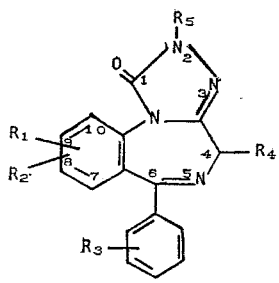

III wherein $R_1$, $R_2$ and $R_3$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino and dialkylamino in which the carbon chain moieties are of 1 to 3 carbon atoms, inclusive, and wherein $R_4$ and $R_5$ are selected from the group consisting of hydrogen and alkyl, defined as above, and the pharmacologically acceptable acid addition salts thereof.

2. The compound of claim 1 wherein $R_1$, $R_3$, $R_4$ and $R_5$ are hydrogen, $R_2$ is 8-chloro and the compound is therefore 8-chloro-2,4-dihydro-6-phenyl - 1H - s - triazolo [4,3-a][1,4]benzodiazepin-1-one.

3. The compound according to claim 1 wherein $R_1$, $R_3$ and $R_4$ are hydrogen, $R_2$ is 8-chloro and $R_5$ is methyl, as a hydrochloride, and the compound is therefore 8-chloro-2,4-dihydro-2-methyl-6-phenyl - 1H - s - triazolo[4,3-a] [1,4]benzodiazepin-1-one hydrochloride.

References Cited

UNITED STATES PATENTS 3,422,091    1/1969    Archer et al. _____ 260—239

OTHER REFERENCES

Potts, Chemical Reviews, 1961, p. 99 (Scientific Lib.).

ALTON D. ROLLINS, Primary Examiner

U.S. Cl. X.R.

71—92; 260— 239 BD, 239.3 D; 424—184, 232, 244, 269

UNITED STATES PATENT OFFICE
CERTIFICATE OF CORRECTION

Patent No. 3,646,055                    Dated February 29, 1972

Inventor(s) Jackson B. Hester, Jr.

It is certified that error appears in the above-identified patent and that said Letters Patent are hereby corrected as shown below:

Column 1, line 11: for "[4,3-a]" read -- [4,3-a][1,4] --; line 32, for "R$_5$ and R$_6$" read -- R$_4$ and R$_5$ --. Column 2, line 14, for "a 1,3" read -- a 1,3- --. Column 4, line 62, for "benzodiazeptine" read -- benzodiazepine --. Column 5, line 9, for "alkenol" read -- alkanol --; line 46, for "3H-" read -- 3H-1,4- --. Column 6, line 6, for "(phenyl]-" read -- )phenyl]- --. Column 8, line 20, for "methyl ester" read -- ethyl ester --; line 48, for "benzodiazepine" read -- benzodiazepin --. Column 9, line 31, for "In a" read -- In the --. Column 11, line 3, for "[4,3-a]" read -- [4,3-a][1,4] --.

Signed and sealed this 25th day of July 1972.

(SEAL)
Attest:

EDWARD M. FLETCHER, JR.                 ROBERT GOTTSCHALK
Attesting Officer                       Commissioner of Patents